United States Patent [19]

Uskert

[11] 4,416,314
[45] Nov. 22, 1983

[54] HACKSAW BLADE CONNECTING MEANS

[76] Inventor: Jerome C. Uskert, 21 N. 675 W., Valparaiso, Ind. 46383

[21] Appl. No.: 390,289

[22] Filed: Jun. 21, 1982

[51] Int. Cl.³ .............................................. B27B 21/02
[52] U.S. Cl. ................................. 145/33 R; 145/35 E
[58] Field of Search ................... 145/33 R, 33 A, 35 E

[56] References Cited

U.S. PATENT DOCUMENTS

| | | | |
|---|---|---|---|
| 267,060 | 11/1882 | Buell . | |
| 492,937 | 3/1893 | Davis | 145/33 |
| 518,420 | 4/1894 | Moxley | 145/33 R |
| 558,781 | 4/1896 | Culver | 145/33 R |
| 656,779 | 8/1900 | Wilson | 145/33 |
| 2,102,782 | 12/1937 | Blum | 145/33 |
| 2,309,816 | 2/1943 | Allen | 145/33 |
| 2,580,896 | 1/1952 | Dohner | 145/35 E |
| 2,869,600 | 1/1959 | Dreier | 145/33 |

*Primary Examiner*—Frederick R. Schmidt
*Assistant Examiner*—J. T. Zatarga
*Attorney, Agent, or Firm*—Walter Leuca

[57] ABSTRACT

Two intersecting slots are provided in the longitudinally spaced blade connecting parts of the hacksaw frame. One of the intersecting slots extends transversely from one lateral side of the blade connecting frame part to the center thereof. A hole is provided extending from the base of the slot, opening to the other lateral side of the blade connecting frame part. A second hole is provided therein extending from the base of the slot transversely into the frame part. The other intersecting slot extends in a longitudinal direction in the blade connecting frame part. The end of the hacksaw blade is fitted in the other slot and the anchor hole in the end of the blade is aligned with the second mentioned hole. A "U" shaped connecting pin is fitted in the transverse slot so that one leg of the pin passes through the hole and the end of the leg extends distally spaced from the other lateral sides of the frame part. The other leg of the connecting pin is truncated and extends into the second hole. The truncated leg extending into the second hole passes through the aligned anchor hole of the hacksaw blade end thereby securing the hacksaw blade to the spaced blade connecting parts of the frame. Spring means is anchored in the transversely extending slot to biasly return the connecting pin in blade locking position and also allow release of the blade by depressing the distally spaced end of the one leg against the bias of the spring thereby retracting the truncated leg from the second hole and the anchor hole of the blade end.

5 Claims, 3 Drawing Figures

HACKSAW BLADE CONNECTING MEANS

BACKGROUND OF THE INVENTION

1. Field of the Invention

This invention relates generally to a hacksaw and more particularly to connecting means for retaining a hacksaw blade assembled to the hacksaw.

2. Description of the Prior Art

This invention is an improved connecting means by which means a hacksaw blade may be assembled to a hacksaw frame easily and rapidly, and retained thereto in a secure manner. The prior art connecting means for securing a hacksaw blade to a hacksaw frame allows accidental disengagement therefrom since the frame may flex or spring when the operator pushes the hacksaw to make a cut on a material which may bind against the blade. Prior art connecting means that I am aware of allowing rapid and easy blade exchange, does not prevent disengagement of the blade from the frame when the frame springs. For example, a conventional connecting means in popular usage is one where the hacksaw frame is provided with laterally extending pins which slant. The pin carried by the distal end of the frame is slanted forwardly and the pin carried by the proximate end of the frame is slanted backwardly. The hacksaw blade is mounted on these pins which are inserted in the holes in the end of the hacksaw blade, and the hacksaw frame, being constructed to longitudinally adjust in reach, is adjusted to space the pins first to mount the blade onto the pins and then spread apart so that the balde is tightened to the base of the pins. However, when the flame flexes or springs during operation due to a momentary binding, the spaced pins move toward each other sufficiently to accidentally release the blade. Such accidental release during operation often causes destruction of the blade and severe injury to the workmans hand since such breakage or release occurs rapidly and unexpectedly and usually during an unbalanced posture of the workman. Other prior art connecting means that I am aware of which renders the blade secure to the frame even when the frame springs, does not allow easy and rapid assembly of a worn or broken blade to the frame.

SUMMARY OF THE INVENTION

Accordingly, I have invented connecting means for a hacksaw frame which allows easy and rapid assembly and disassembly of a hacksaw blade thereto, and at the same time securely connect the hacksaw blade to the frame even when the frame flexes thereby preventing breakage of the blade or accidental release thereof.

My invention comprises two intersecting slots formed in the longitudinally spaced blade connecting parts of the hacksaw frame. One of the intersecting slots extends transversely from one lateral side of the blade connecting frame part to the center thereof. A hole is provided extending from the base of the slot, opening to the other lateral side of the blade connecting frame part. A second hole is provided therein extending from the base of the slot transversely into the frame part. The other intersecting slot extends in a longitudinal direction in the blade connecting part. The end of the hacksaw blade is fitted in the other slot and the anchor hole in the end of the blade is aligned with the second mentioned hole. A "U" shaped connecting pin is fitted in the transverse slot so that one leg of the pin passes through the first mentioned hole and the end of the leg extends distally spaced from the other lateral side of the frame part. The other leg of the connecting pin is truncated and extends into the second mentioned hole. The truncated leg extending into the second hole passes through the aligned anchor hole of the hacksaw blade end thereby positively secures the hacksaw blade to the spaced blade connecting parts of the frame. Spring means is anchored in the transversely extending slot to biasly retain the connecting pin in blade locking position and also allow release of the blade by depressing the distally spaced end of the one leg against the bias of the spring thereby retracting the truncated leg from the second hole and the anchor hole of the blade end.

Other objects and advantages of this invention will become apparent after a more careful study of the detailed description thereof which is to be read with reference to the accompanying drawing wherein is illustrated a preferred embodiment of this invention.

DETAILED DESCRIPTION OF THE INVENTION

Figure 1:
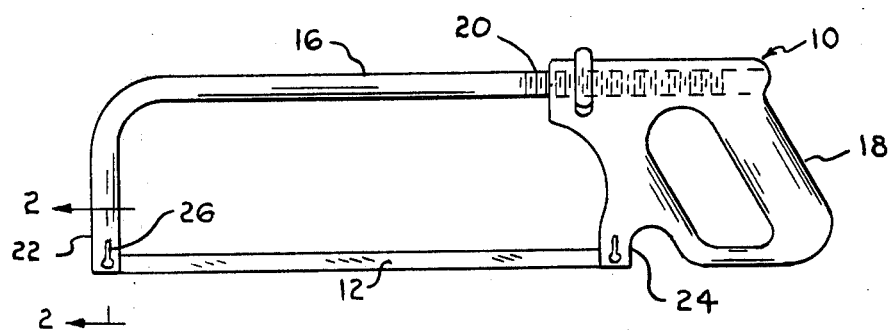
FIG. 1 is a side elevation of the hacksaw frame and blade combination including the connecting means of my invention.
Figure 3:
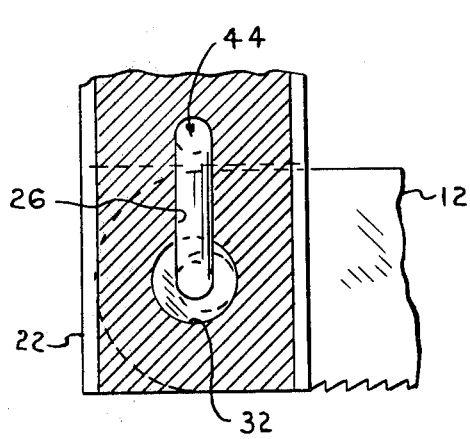
FIG. 3 is a sectional view thereof taken along lines 3—3 of FIG. 2.
Figure 2:
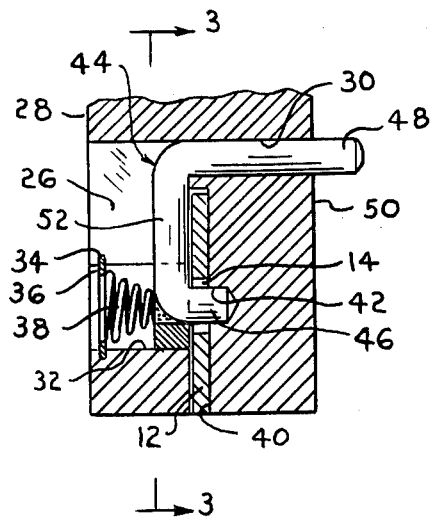
FIG. 2 is a cross-sectional view of the distal end of the hacksaw frame and hacksaw blade assembled thereto taken along lines 2—2 of FIG. 1 showing the operative members of the connecting means of my invention in detail.

Referring now more particularly to the drawings wherein is illustrated a preferred embodiment of this invention, reference numeral 10 designates generally the hacksaw frame which includes the connecting means of my invention. Reference numeral 12 designates generally a conventional hacksaw blade formed with anchor holes 14 at each end thereof. Hacksaw frame 10 is conventionally formed to include a longitudinally extending bar 16, handle member 18 connected to the proximate end 20 of bar 16 by means which allows longitudinal adjustment thereon in order to position the distal end part 22 of bar 16 longitudinally spaced relative to blade connecting means formed in proximate end part 24. Distal end part 22 of bar 16, as more clearly shown in FIGS. 2 and 3, is formed with a slotted recess 26 open to one lateral side 28 thereof and extending to the center thereof. The top of slotted recess 26 is provided with hole 30 extending laterally through the solid stock of end part 22, and the bottom part of slotted recess 26 is circularly enlarged as at 32 and grooved as at 34 to retain therein a back up spring anchor ring 36. Ring 36 serves as a seat for coil spring 38. End part 22 is further formed with blade slot 40, the plane of which intersects the plane of slotted recess 26 at right angles. Coaxially aligned with circular enlargement 32 of slotted recess 26 is bore 42 formed in the solid stock of end part 22. Hacksaw blade connecting pin 44 is "U" shaped, having one leg 46 thereof truncated so that it may be contained entirely within bore 42. The other leg 48 of connecting pin 44 extends through hole 30 at the top of recess 26, distally terminating spaced from the opposite lateral side 50 of end 22. Base 52 of connecting pin 44 is laterally moveable in slotted recess 26. The other end of coil spring 38 bears against base 52 opposite truncated leg 46 biasly retaining connecting pin 44 in position to securely and positively engage hacksaw blade 12 through hole 14 when the end thereof is inserted in slot 40. The other end of hacksaw blade 12 is inserted in the corresponding blade slot 40 in part 24 of handle 18. The elements of the connecting means of this invention in part 24 is identically formed and the opposite end of hacksaw blade 12 is similarly assembled thereto. Accordingly, the structure of the connecting means of my invention in part 24 of handle 18 is not described since the structure an operation thereof will be a duplication of the structure and operation of the connecting means in end part 22.

In the operation of this invention, the distally spaced end of leg 48 of connecting pin 44 is manually depressed against the bias of coil spring 38, thereby laterally shifting base 52 in slotted recess 26 to the extent that truncated leg 46 connected to base 52 is retracted from hole 14 of hacksaw blade 12, allowing hacksaw blade 12 to be assembled or removed from hacksaw frame 10 easily and quickly. It is obvious that when connecting pin 44 is normally positioned so that legs 48 and 46 are in hole 30 and bore 42, respectively, and base 52 engages the side of blade 12 due to the bias of spring 38 acting against pin 44, blade 12 will not be accidentally released when the hacksaw frame 10 flexes or springs due to a momentary binding condition.

I claim:

1. In a hacksaw frame and blade combination wherein the hacksaw frame includes a handle member, and a longitudinally spreadable contractable member having spaced end parts supporting the ends of a hacksaw blade, the improvement thereof comprising;
    each of said parts of said hacksaw frame being formed with a slotted recess and spaced first and second holes in said part;
    said part having a second slotted recess in said part intersecting said first slotted recess for receiving therein one end of said hacksaw blade;
    a pin having a "U" shape, one leg thereof extending through said first mentioned hole in said part, a second leg of said pin member being truncated and extending into said second hole, and a base member connecting said legs moveable laterally in said grooved recess; and
    a spring member anchored in said grooved recess, one end thereof engaging said base of said pin biasly retaining said first and second legs in said holes.

2. The hacksaw frame of claim 1 wherein the first mentioned slotted recess in said part is further characterized as extending from one lateral side of said part to the center thereof, and said first hole is further characterized as extending through said part from said recess to the other lateral side of said part, and said second hole is further characterized as extending from said recess laterally in said part.

3. The hacksaw frame of claim 1 wherein the second slotted recess in said part is further characterized as intersecting said first slotted recess perpendicular thereto.

4. The hacksaw frame of claim 1 wherein said one leg of said pin is further characterized as extending through said first mentioned hole so that the end thereof is distally spaced from said other lateral side of said part, and said spaced end being greater in length than said second leg.

5. In a hacksaw frame and blade combination wherein the hacksaw frame includes a handle member, and a longitudinally spreadable and contractable member having spaced end parts for supporting the ends of a hacksaw blade, the improvement thereof comprising;
    each of said parts of said hacksaw frame being formed with a slotted recess extending from one lateral side thereof to the center of said part, a hole extending through said part from said recess to the other lateral side of said part, and a second hole extending from said recess laterally in said part;
    said part having a second slotted recess extending longitudinally in said part intersecting said first slotted recess perpendicular thereto for receiving therein one end of said hacksaw blade;
    a pin having a "U" shape, one leg thereof extending through said first mentioned hole in said part, the end of said leg extending distally spaced from said other lateral side of said part, a second leg of said pin member being truncated and extending into said second hole, said end of said leg distally spaced from said other lateral side of said part being greater in length than said second leg, and a base member connecting said legs moveable laterally in said grooved recess; and
    a spring member anchored in said grooved recess, one end thereof engaging said base of said pin biasly retaining said first and second legs in said holes.

* * * * *